United States Patent [19]

Sekine et al.

[11] Patent Number: 5,434,683
[45] Date of Patent: Jul. 18, 1995

[54] COLOR IMAGE EDITING APPARATUS

[75] Inventors: Hiroshi Sekine; Kazuman Taniuchi; Katuyuki Kouno; Yoshihiro Terada; Isao Kuwahara; Kiyomasa Endoh, all of Kanagawa, Japan

[73] Assignee: Fuji Xerox Co., Ltd., Tokyo, Japan

[21] Appl. No.: 881,999

[22] Filed: May 13, 1992

[30] Foreign Application Priority Data

May 14, 1991 [JP] Japan .................. 3-109181

[51] Int. Cl.⁶ .............................................. H04N 1/60
[52] U.S. Cl. ...................................... 358/520; 358/518
[58] Field of Search ........................ 358/22, 28, 75, 80, 358/452, 453, 518, 520; 395/131, 132, 146; H04N 1/46; 348/703, 649

[56] References Cited

U.S. PATENT DOCUMENTS

| | | | |
|---|---|---|---|
| 4,679,072 | 7/1987 | Takayama | 348/649 |
| 4,805,016 | 2/1989 | Kato | 348/649 |
| 4,989,080 | 1/1991 | Ito | 358/80 |
| 5,121,196 | 6/1992 | Hung | 358/80 |
| 5,200,832 | 4/1993 | Taniuchi et al. | 358/80 |
| 5,220,620 | 6/1993 | Nakano et al. | 358/520 |
| 5,245,417 | 9/1993 | Hibi et al. | 358/518 |
| 5,289,295 | 2/1994 | Yumiba et al. | 358/515 |
| 5,335,097 | 8/1994 | Murakami | 358/520 |
| 5,384,601 | 1/1995 | Yamashita et al. | 358/520 |

FOREIGN PATENT DOCUMENTS 1-143561 6/1989 Japan .
2-294879 12/1990 Japan .

Primary Examiner—Edward L. Coles, Sr.
Assistant Examiner—Kim Yen Vu
Attorney, Agent, or Firm—Finnegan, Henderson, Farabow, Garrett & Dunner

[57] ABSTRACT

A color image editing apparatus capable of improving color detecting accuracy, color-converting a chromatic color into a neutral (achromatic) color and vice verse and performing a hue conversion, while maintaining gradation. The color image editing apparatus in which image signals read out by an image reading unit are converted to density, hue and chroma signals by color display coordinate system convertor to perform a color image editing operation inlcudes a detector for detecting whether or not density, hue and chroma of a detected color image is within predetermined density, hue and chroma ranges, respectively. It is judged by a judging unit whether or not a color of the detected color image is of a predetermined color in responses to an output of the detector, and a color changing unit means converts the density, hue and chroma independently in response to the judgement result of the judging unit.

3 Claims, 6 Drawing Sheets

COLOR IMAGE EDITING APPARATUS

BACKGROUND OF THE INVENTION

1. Field of the Invention

The present invention relates to a color image editing apparatus capable of changing a certain color designated in an image to another color.

2. Description of the Related Art

In a conventional color image editing apparatus for use in a color copying machine, a color original is placed on an editor pad, so that a certain color present on the color original is designated to store the color to be changed. Subsequently, after scanning the original color image, partial color converting process is carried out in such a manner that the portion in the color original, which is colored by the stored color to be converted, is subjected to color conversion to be colored with another color.

In this case, the reading operation by the scanner is achieved not in an equivalent color spatial coordinate system such as density (V), hue (H) and saturation (C) but in a color display coordinate system with R, G, B or Y, M, C. Accordingly, it is difficult to uniformly detect the colors having high density and low density. There may ocuur problems that if the detection range is narrowed in order to improve detection accuracy, the color detection is performed imperfectly, and also if the detection range is broadened, the color detection is carried out eroneously.

In view of these problems, there has been proposed such a color image editing apparatus in Published Unexamined Japanese Patent Application No. 143561/1989 that while the color judgement is executed, a natural color-converted image can be obtained by merely substituting the color of the designated hue with the color of other hue with the density, hue, and chroma.

When image data is color-converted with regard to the density (V), hue (H) and saturation (C), the color conversion can be done by only changing the H (density) data. However, the H data substitution cannot convert the converted color into the achromatic (neutral) color. Furthermore, since a difference by hue in colors adjacent a gray color becomes very small, color discrimination becomes difficult if a simple judgement is made. Moreover, since the chroma detecting sensitivities are varied in accordance with density of the color, there is such a problem that the colors having low density are recognized as gray eroneously.

SUMMARY OF THE INVENTION

The present invention has been made in an attempt to solve the above-described problems, and therefore, it is an object of the invention to provide a color image editing apparatus capable of improving color detecting accuracy, color-converting a chromatic color into a neutral (achromatic) color and vice verse and performing a hue conversion, while maintaining gradation.

The above, and other objects of the present invention is accomplished by the provision of a color image editing apparatus in which R, G, and B signals read out by an image reading means are converted to density (V), hue (H) and chroma (C) by color display coordinate system converting means to perform a color image editing operation, comprising a detecting means for detecting whether or not density, hue and chroma of a detected color image is within predetermined density, hue and chroma ranges, respectively, judging means for judging whether or not a color of the detected color image is of a predetermined color in responses to an output of the detecting means, and color converting means for converting the density, hue and chroma independently in response to the judgement result of the judging means.

DESCRIPTION OF THE PREFERRED EMBODIMENTS

Figure 1:
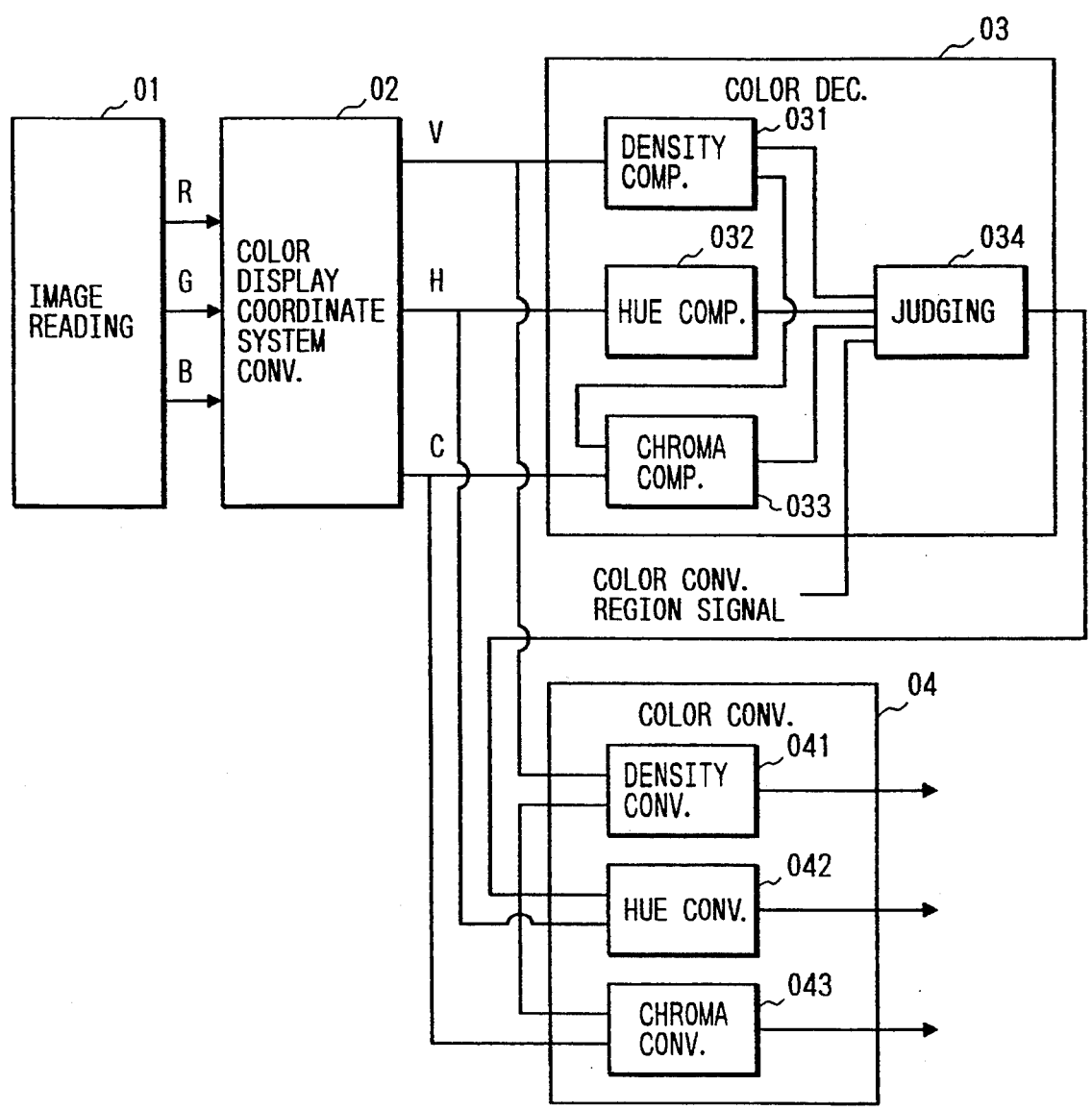
FIG. 1 is a block diagram showing the function structure of an embodiment of a color image editing apparatus according to the present invention.
Figure 2:
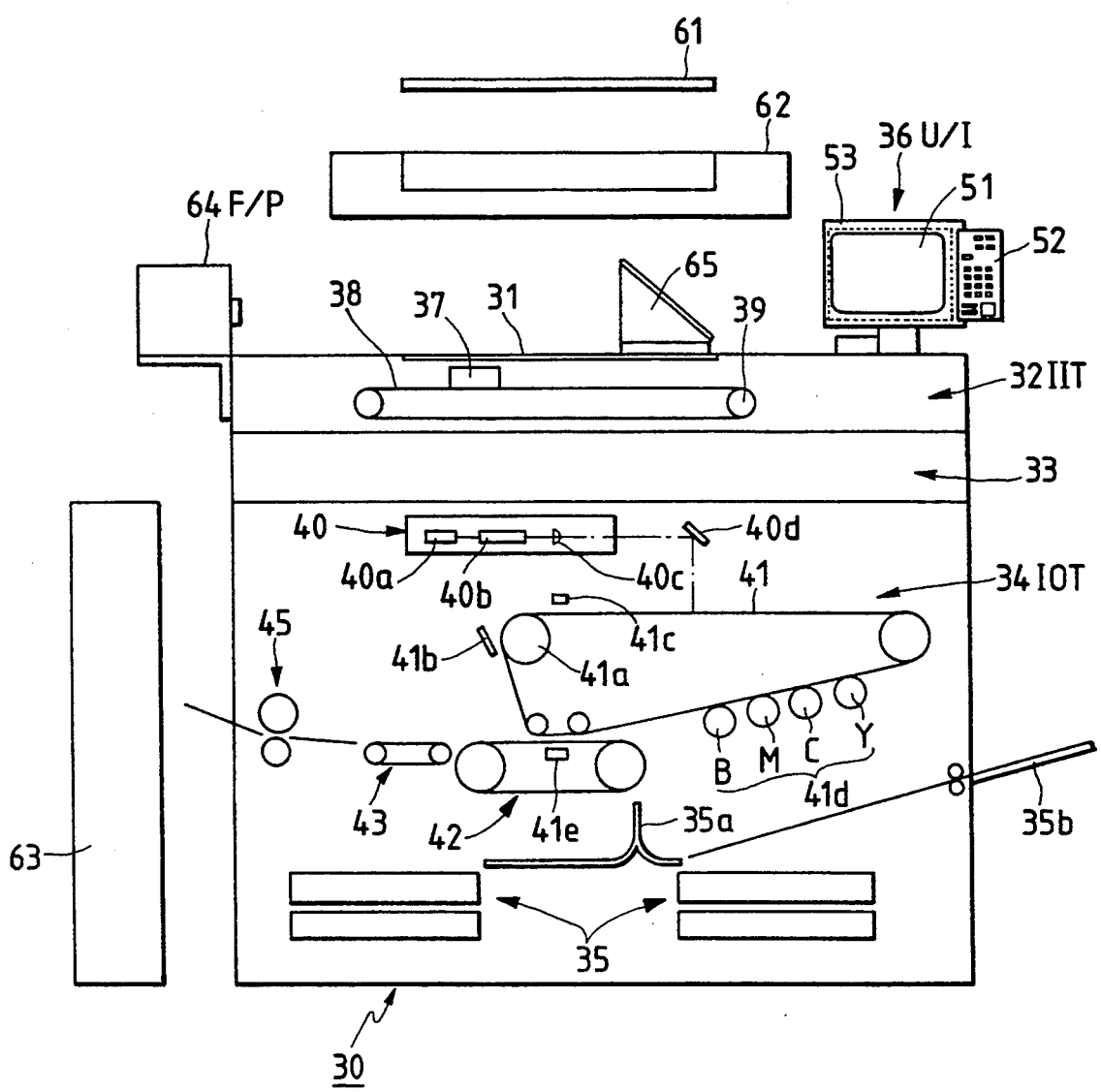
FIG. 2 is a schematic diagram showing a color copying machine to which the present invention is applied.
Figure 3:
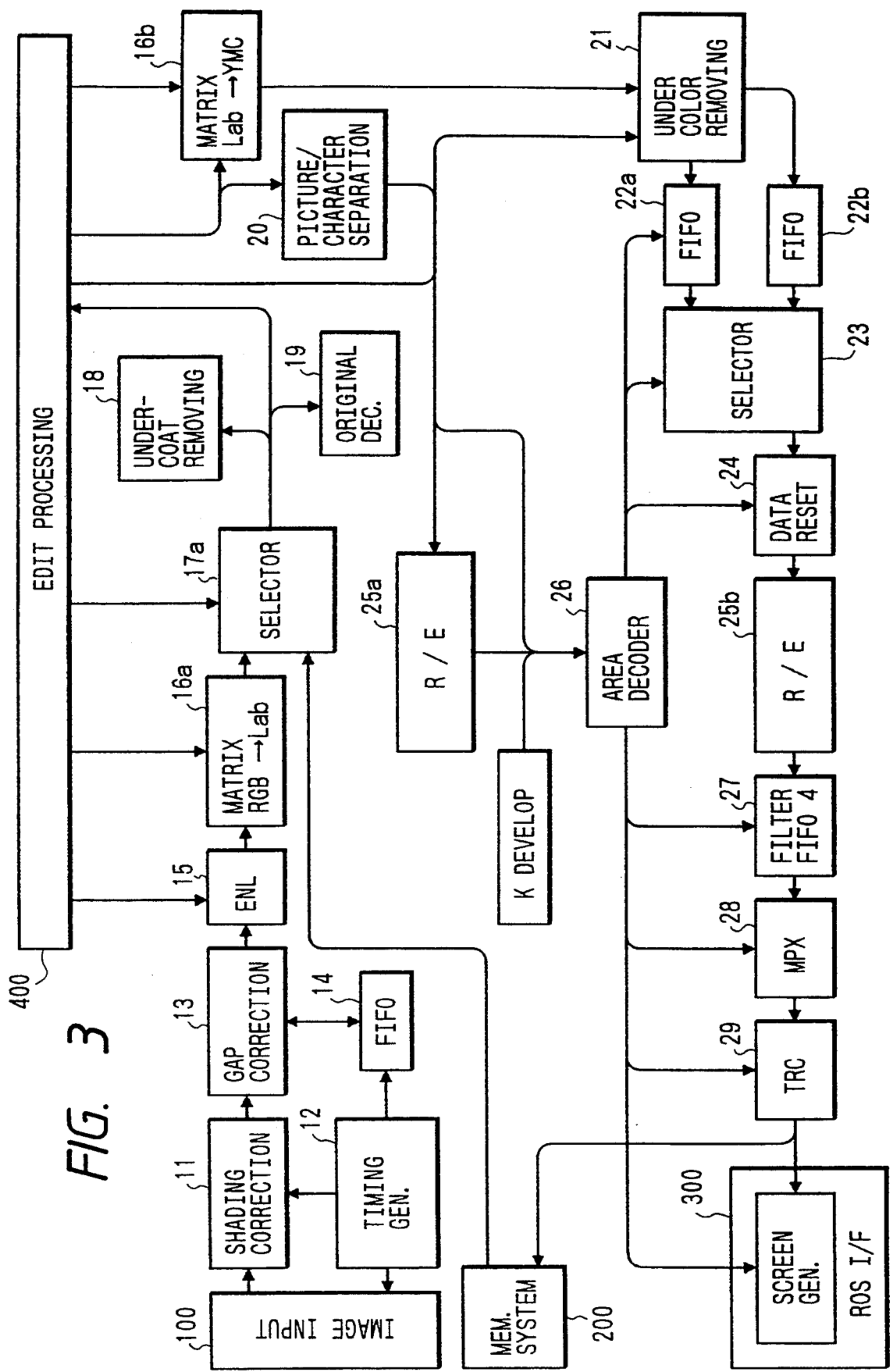
FIG. 3 is a block diagram showing an image processing circuit.
Figure 4:
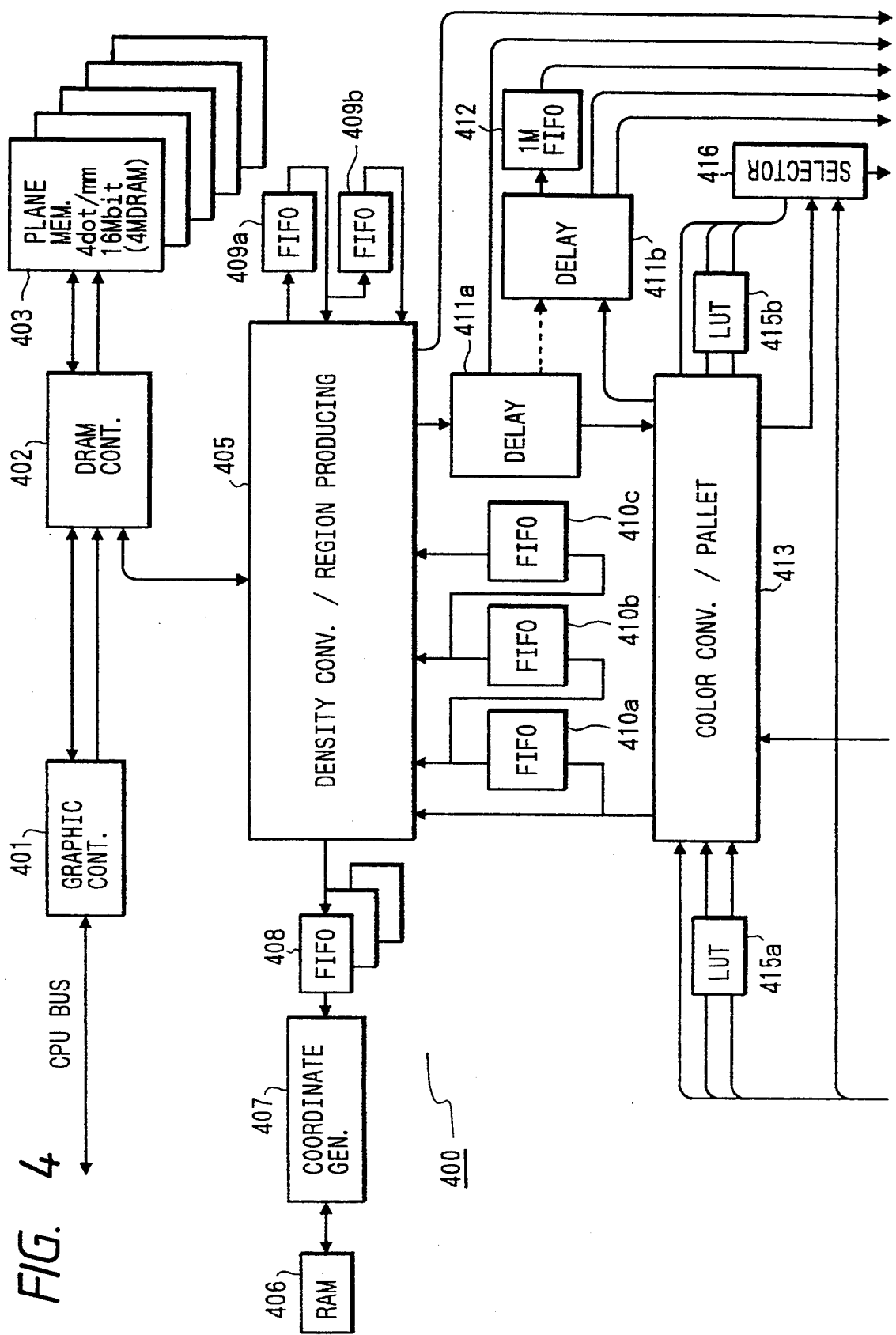
FIG. 4 is a block diagram of color edit process.

FIG. 1 is a block diagram showing function blocks of a color image recognition apparatus according to the present invention, FIG. 2 is a schematic diagram showing a color copying machine to which the present invention is applied, FIG. 3 is a block diagram showing an image processing circuit, and FIG. 4 is a block diagram of color edit processing. The present invention will be described in summary with reference to FIGS. 2 to 4.

The color copying machine shown in FIG. 2 comprises a base machine 30 and a film image reading apparatus as an option. The base machine 30 includes a platen glass 31 on which an original is placed, an image input terminal (II) 32, a unit for accommodating an electric control system 33, an image out terminal (IOT) 34, a paper tray 35, and a user's interface (U/I) 36. The film image reading apparatus includes an edit pad 61, an automatic document feeder (ADF) 62, a sorter 63 and a film projector (F/P) 64 and a mirror unit (M/U) 65.

The image input terminal 32 includes an imaging unit 37, a wire 38 for driving the unit 37, a drive pulley 39 and the like. This image input terminal 32 converts into multi-gradation digital image signals B, G, R, image information of a color original which is color-separated by color filters provided in the imaging unit 37 into optical primary colors B (blue), G (green) and R (red), and then read out by a CCD line sensor. The image process system which is accommodated in the unit 33, performs various processes such that various conversions, correcting processes, and further editing processes are carried out so as to improve colors, gradation precision, other image qualities and reproducibility. Also, this image process system converts the image signals B, G, R into primary colors Y (yellow), M (magenta), C (cyan), and K (black) of a toner, and converts gradation toner signals of process colors into binary (ON/OFF) toner signals which are then applied to the image output terminal 34. The image output terminal 34 includes a scanner 40 and a sensitive material belt 41, in which the image signals are converted into optical signals in a laser output unit 40a so that a latent image corresponding to the original image is formed on the sensitive material belt 41 through a polygon lens 40b, F/θ lens 40c and a reflection mirror 40d. The latent image is transferred to a paper supplied from the paper tray 35 to thereby obtain and discharge a color copy therefrom.

In the image output terminal 34, the sensitive material belt 41 is driven by the drive pulley 41a, a cleaner 41b, a charger 41c, developers 41d of YMCK and a transfer unit 41e are arranged around the sensitive material belt 41. A transfer device 42 is positioned facing to the transfer unit 41e. Then, the paper supplied from the paper tray 35 via a paper transportation path 35a is caught by the image output terminal 34. In case of a four-color full color copy, the transfer device 42 rotates four times to transfer the respective latent images of YMCK onto the paper, and the paper is then transported from the transfer device 42 through a vacuum transporting device 43 to a fixing device 45 so as to fix the copied image thereon, whereby the fixed color copy is ejected. A SSI (single sheet inserter) 35b may selectively supply a single sheet of paper by a manual mode into the paper transportation pat 35a.

The user's interface 36 is provided so that the user selects a desired function to instruct executing conditions. The interface 36 includes a color display 51 and a hard control panel 52, and the user can directly make instructions by operating soft buttons displayed on the display 51 in combination with an infrared touch board 53.

The unit 33 accommodates a plurality of control boards which are constructed by separating various processing units into each unit such as the image input terminal 32, the image output terminal 34, the user interface 36, an image processing system and a film projector 64; an MCB board (machine control board) for controlling various mechanisms of the image output terminal 34, the automatic original feeding apparatus 62 and a sorter 63; and also an SYS board for controlling the entire system.

FIG. 3 is a schematic block diagram showing an overall arrangement of data processing system of the color copying machine according to the present invention.

An image input unit 100 includes a compression type sensor having three line sensors R,G,B arranged perpendicular to the subscanning direction, and the unit 100 operates to scan in synchronization with a timing signal derived from a timing generating circuit 12, thereby to read images. The thus read image data is subjected to shading-correction in a shading correction circuit 11 to be applied to the following gap correction circuit 13 where gap correction among the respective line sensors is effected. This gap correction is carried out in such a manner that the read image data is delayed by time corresponding to this gap in a FIFO 14, whereby the image signals R, G, B at the same position are obtained at the same time instant.

An ENL (equivalent Neutral Lightness) 15 is provided to perform a gray balance, and to reverse gray for each pixel so as to invert a negative/positive relationship in response to a negative/positive inverting signals from an edit processing unit 400 described later in detail, for instance, can invert the negative/positive relationship of a certain designed region. The gray-balanced image signals R, G, B are converted into the image signals "L", "a" and "b" in a matrix circuit 16a in response to a control signal from the edit processing unit 400. It should be noted that "L*", "a*" and "b*" which are subjected to standardization, may be available instead of the image signal "L", "a" and "b". The conversion from R, G, B into L, a, b is to easily interface this unit with an external computer.

A selector 17 is provided to selectively derive either an output from the matrix circuit 16a, or image data from a memory system 200 functioning as an interface with the external computer under control of a signal from the edit processing unit 400. An undercoat removing circuit 18 stores minimum density of an original during a prescanning operation and also maximum density thereof so as to improve an image quality of a copy for such a foggy original as a newspaper by skipping a pixel having density lower than the minimum density. An original detecting circuit 19 detects a boundary between a back side of a black platen and an original, and detects a size of the original irrelevant to a setting position of this original even when this original is positioned upright the scanning direction, and also stores the detected original size. The image signals which have been color-edited by the edit processing unit 400 are converted from L, a, b into toner colors of Y, M, C by the matrix circuit 16b, and black toner signals are formed by an under color removing circuit 21 to thereby generate Y, M, C and K. At the same time, a judgement is made whether the color-edited image signal is of a color character, a black character, or a picture pattern by a picture/character separating circuit 20. In the under color removing circuit 21, a hue signal and development color signals Y, M, C, K are temporarily stored into a FIFO 22a and a FIFO 22b, depending upon the character data or the picture pattern. These signals are selectively read out by the selector 23. In case of the black character, the data on Y, M and C are reset by the data reset circuit 24, whereas in case of either the color character or the picture pattern, these data are allowed to pass therethrough. A reduction/enlargement circuit 25a is provided to prevent the color editing region from being shifted from the normal copy region even when the reduction and enlargement operations are carried out. The reduction/enlargement information are decoded by an area decoder 26 to be supplied to various processing units. The image data which is reduced or enlarged by the reduction/enlargement circuit 25b, is subjected to Moire -elimination and edge-emphasizing in a filter 27, and then a color adjustment and a density adjustment with respect to the color characters, black characters and picture patterns are carried out by properly selecting coefficients for the respective color components in a multiplier 28. This image data is either stored into a memory system 200, or outputted as an image at ROS 300.

FIG. 4 is a schematic block diagram showing an overall arrangement to edit/process image data.

An edit processing unit 400 is provided to perform a color edit and a region production, in which the image signals L, a, b from the selector 17 are converted into L, C, H in order that the color edit and color conversion may be readily performed at LUT 415a, and 24-bit image data is converted into 20-bit image data so as to reduce a memory capacity of a color conversion/pallet 413 provided at the post stage thereof. The color conversion/ pallet 413 includes 32 different sorts of color pallets used in the color edit operation. Only the image data of the region to be color-converted are inputted into the color conversion/pallet 413, and the image data of other regions are directly transferred to the selector 416 and then are sent to the above-explained matrix circuit 16b. The L, C, H signals which have been color-converted are again converted into the L, a, b signals to thereby return to the 24-bit data to be applied to the selector 416. Both of marker signals (three colors) and a 4-bit close region signal from the color conversion/pallet 413 are applied to a density converting/region producing circuit 405. At this time, the density conversion from 400 spi to 100 spi is effected by performing such a binary process with employment of the FIFO 410a, 470b and 410c by 4×4 window that if the number of black pixels within 16 pixels of a 4×4 window is greater than or equal to a predetermined number, the block pixel signals are set to "1". The density converting/region producing circuit 405 writes the thus produced markers (closed loop and marker dot) into a plane memory 403. Also, as to the marker dot signals, the marker signals are delayed by 9 lines by way of the FIFO 408 in order not to erroneously detect a small dust as the marker, and the marker/dot detection is performed by a 9×9 window, whereby coordinate values of the marker and dot are produced and then stored into a RAM 406. It should be noted that although these marker and dot data are stored also in the plane memory, this process is carried out in order to present such an error detection.

The plane memory 403 acts as a memory for producing a region when the color edit operation is carried out, into which, for instance, the region may be written by an editor pad. That is to say, the coordinate data designated by the editor pad is transferred via a CPU bus to a graphic controller 401, and then the region is written via a DRAM controller 402 into the plane memory 403 in response to an address signal from the graphic controller 401. The plane memory 403 includes four planes, and since the region-reading out operations from the plane memory are simultaneously performed with respect to four planes, respectively, 16 sorts of regions from 0 to 15 may be produced.

When the region data are from the plane memory 403, in order that the closed loop curve does not become a zigzag line, the region data are delayed by 4 lines in the FIFO 409a and 409b, and are interpolated so that the density conversion from 100 spi to 400 spi is performed under control of the density conversion/region generation circuit 405. The timing adjustment of the color-edited data is carried out by way of delay circuits 411a, 411b and 1 MFIFO so that the timing with the image data read by the image input unit can be adjusted.

In FIG. 1 which is a block diagram showing the function structure of an embodiment of a color image editing apparatus according to the present invention, color image data R, G, B which are read out by an image reading means 01 are converted to density (V), hue (H) and saturation (C) by a color display coordinate system converting means 02. The V, H, and C data are subjected to comparison in density comparing means 031, hue comparing means 032, and saturation comparing means 033 (will be discussed later) to detect whether or not the V, H, and C data are within a predetermined range with regard to colors which are designated by either an editor pad or a console panel in advance. This comparison result is applied to judging means 034 in which it is judged whether or not the read out color image is of a color image which has been designated, or whether or not the read out color image is within a color conversion region. In response to this judgement result, the V, H, C data are converted by the density converting means 041, hue converting means 042, and saturation converting means 043.

Figure 5:
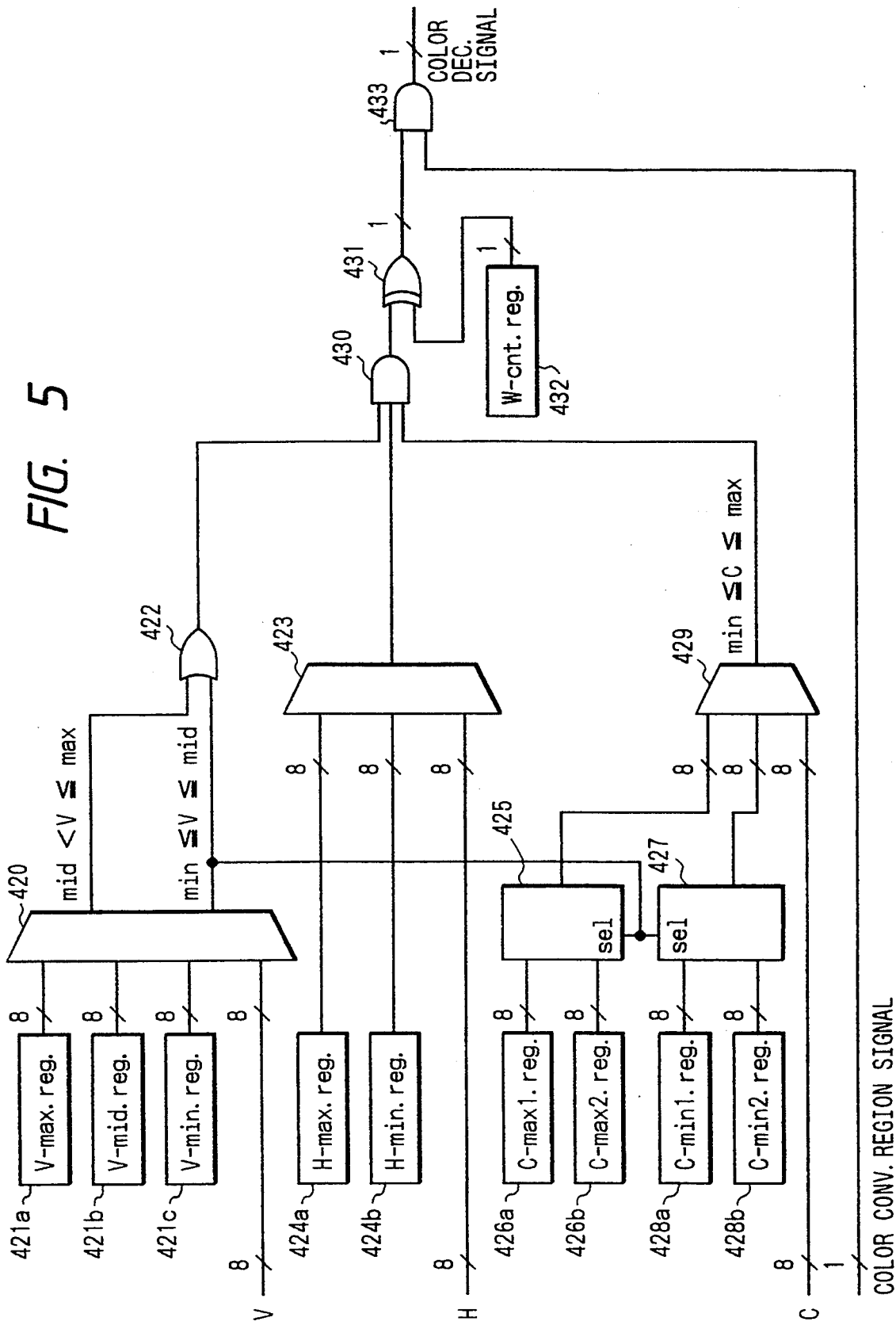
FIG. 5 is a circuit diagram showing a color detecting circuit.

A concrete example of the color detecting means 03 is as shown in FIG. 5.

In FIG. 5, 8-bit V, H, C data are inputted into window comparators 420, 423, 429 so as to be compared with predetermined values, respectively. Connected to the window comparator 420 are registers 421a and 421c, in which a maximum density value V max and a minimum density value V min are set with regard to each of the designated colors, respectively. Further, a register 421b is connected to the window comparator 420, in which a medium density value V mid is set, so that it is decided whether the read out image density V is within a range defined by V max or V min, and if so, the image density value V is further subjected to comparison with the medium density value V mid. As a result of the comparison, the window comparator 420 produces an output of either "1" or "0" to an OR circuit 422 from which the result representing whether the read out image density V is withint the range of V max and V min or not.

The hue data H is subjected to comparison in the window comparator 423 to detect whether it is within a range of H max and H min which are set in registers 424a and 424b with regard to each of the designated colors, respectively. The window comparator 423 produces an output of "1" when the hue data H is within the range whereas is produces an toutput of "0" when it is outside the range.

Two sorts of maximum chroma values C max 1 and C max 2 are set to the registers 426a and 426b with regard to each of the designated colors, and two sorts of minimum chroma values C min 1 and C min 2 are set to the registers 428a and 428b with regard to each of the designated colors. These data set in the registers are switched by selectors 425 and 427 in response to a result of detection whether the density data V is of higher density than the V mid or lower. These switched maximum and minimum set values are compared with the chroma data C in the window comparator 429. If the chroma data C is within the range determined by these switched maximum and munimum set values, then the window comparator 429 produces an output signal of "1". On the other hand, if the chroma data C is outside the range, the window comparator 429 produces an output signal of "0". Due to the switching of the comparison reference values, it is possible to make the comparison reference value smaller in case of the density data V being of lower, to thereby make it possible to detect relatively lower data.

When the detected V, H, C are within the range set according to the designated color, an AND circuit 430 produces an output signal of "1" representing that the read out image is of the disignated color. The output of the AND circuit 430 is inputted to one input terminal of an exclusive OR gate circuit 431. On the other hand, the binary data from the register 432 is applied to the other input terminal thereof. For instance, assuming that "0" has been set into the register 432, when the AND circuit 430 produces an output of "1", the exclusive OR gate circuit 431 produces an output of "1". In contrast, assuming that "1" has been set into the register 432, even when the AND circuit 430 produces an output of "1", the exclusive OR gate circuit 431 produces an output of "0". That is to say, if "0" is set to the register 432, when the iamge color is judged as the designated color by the AND circuit 430, the color detection signal is allowed to pass therethrough without inversion. If "1" is set to the register 432, when it is judged as the designated color, the color detection signal is outputted after invesion, so that a selection can be done whether the designated color is converted, or the not designated color is converted. The output from this exclusive OR gate circuit 431 is AND-gated with the color conversion region signal in an AND circuit 433, and when this AND-gated value corresponds to the region produced in the above-described memory plane, it is outputted as a color detection signal to designate a color conversion region.

When the comarison reference values are switched to the smaller values set in the resistors due to the fact that the density data V is of lower density side, namely when the chroma is of low, it may be allowed to take no care to the hue by way of a software. This implies that the color difference caused by the hue becomes very small around gray, and therefore it is improper to carry out the color discrimination by way of the simple window comparison. In this case, when the chroma C is not higher than a predetermined level, the black detection is carried out.

Figure 6:
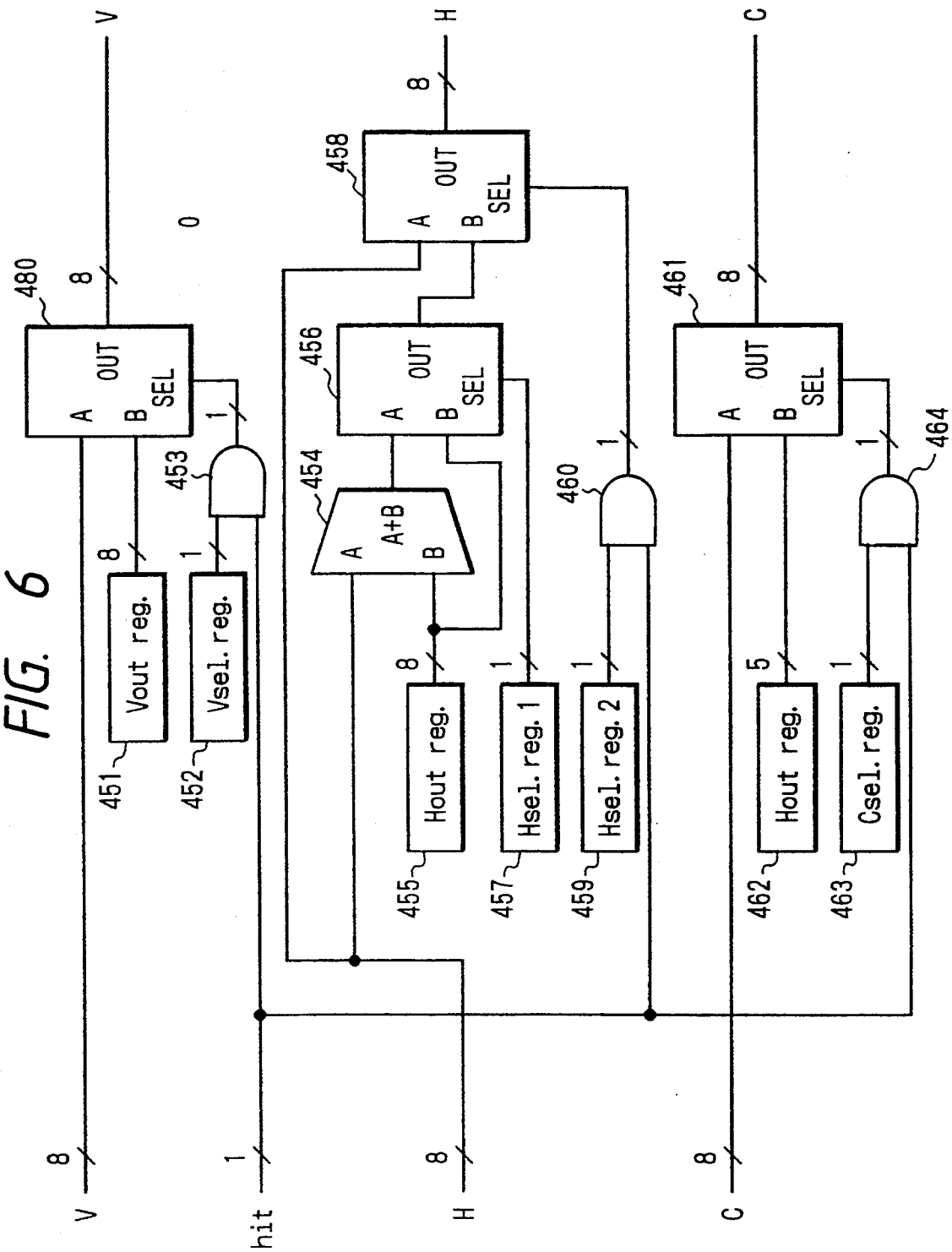
FIG. 6 is a circuit diagram showing a color converting circuit.

In FIG. 6, there is shown a concrete example of the color converting means shown in FIG. 1.

In FIG. 6, a "hit" signal corresponds to the color detection signal of FIG. 5, which is an output of the AND gate circuit 433. This color detection signal is AND-gated with the select set value set in the respective registers 452, 459 and 463 by the AND circuits 453, 460, 464. Outputs from the respective AND circuits 453, 460, 464 are applied to the selectors 450, 458 and 461, respectively, as a select signal. When the AND circuits 453 and 464 produces outputs of "0", an A input such as the video signals of V, H, C are selected. When the AND circuit 453 and 464 produces outputs of "1", the outputs of a register 451, a selector 456 and a register 462, which are B input to the respective selectors 450, 458 and 461, are selected. The density value of the converted color has been stored in the register 451 which is selected by the selector 450. If the select set value of the register 452 is equal to "1", then either the detected density value V or the conversion color is set in accordance with the color detection signal. When the color detection (hit) signal is equal to "1", the designated color portion is converted to the set density value of the register 451. When the color detection signal is equal to "0", the region other than the designated color portion is not converted and the density V is directly outputted. If the select set value of the register 452 is equal to "0", the output of the AND circuit 453 becomes "0" regardless of the color detection signal, and the detected density V is continuously selected without conversion.

The hue data H is added to or subtracted from the output of the register 455 where the hue data after being converted is set, in an adder/subtracter 454. Normally, in case of the color designation being performed by the editor pad, only one point is designated within a certain region to be subjected to the color detection. If this color is entirely converted into a color to be converted, for instance, if a color of an apple whose hue is slightly different over a certain region is changed to an orange color of a lemon, the color of this apple is changed to the orange color of the lemon entirely. To avoid such a problem, a value of the detected hue is left by adding-/subtracting the hue data H with the color after being converted in the adder/subtracter 454, so that hue information different from each other, depending on places, is tried to be left.

More specifically, assuming now that overall hue of an apple is expressed by 80 to 120, hue at a point where a color is designated is expressed by 100; and hue of a lemon to be converted is expressed by 150, if 50 is set to the register 455, then hue after summation becomes 130 to 170. This results in that the colors are changed with having different hue, depending upon the places thereof. Since the output of the adder/subtracter 454 and the output of the register 455 are selected by the selector 456, it can be accomplished to paint the designated portion with a single color entirely by selecting the B input to the selector 456. Furthermore, since a selection can be done between the hue data H itself read by the selector 458 and the output of the selector 456, eventually three sorts of hue data may be selectively outputted from the read hue data, the hue data obtained by adding/subtracting the read hue data with the hue values after being converted; and the hue data after being converted.

Either the chroma data "C" or the output from the register 462 where the converted chroma data has been set, is selectively output as a chrom data output. As is similar to the case of the desity v, the switching of the signal is carried out by both the color detection (hit) signal and the select set value set in the register 463. When the set value of the register is "1", both of the detected chroma C and the converted chroma are selected in accordance with the color detection signal. On the other hand, when the set value of the register is "0", the detected chroma C is continuously selected and no conversion is performed.

With such a color converting means as described above, it is possible to select either the V, H, C of the image read out or the V, H, C to be converted, and it is also possible to select either the add/subtract value of the read hue and the converted hue or the hue after being converted with ease. Further, since "1" or "0" can be set into the registers 452, 457, 459 and 463 independently, it is possible to change the hue with maintaining the density, or to change the color image to the monochrome image. Furthermore, the density and saturation can be changed with maintaining the hue, or can be freely subjected to conversion.

According to the present invention, since the conversion from the chromatic color into the neutral color, and the hue conversion with maintaining the gradation can be freely performed, and also the detection accuracy of the chroma can be changed in accordance with the density, the chroma can be detected with high accuracy even under low density.

We claim:

1. A color image editing apparatus comprising:
    image reading means for generating image data having primary colors from an optical color image;
    conversion means for converting the primary colors into density, hue and chroma;
    detecting means for determining whether or not density, hue and chroma is within predetermined density, hue and chroma ranges, respectively;
    judging means for judging whether or not a color of the image data is of a predetermined color in response to determinations of said detecting means; and
    color changing means for changing the density, hue and chroma independently in response to the judgement result of said judging means,
    said judging means comprising first AND circuit for subjecting the determinations of the density, hue and chroma to logical product; an exclusive OR circuit having one input terminal receiving an output of said AND circuit and another input terminal receiving an output of a register where binary data is set; and a second AND circuit to which both an output of said exclusive OR circuit and a color conversion region signal are inputted.

2. A color image editing apparatus comprising:

image reading means for generating image data having primary colors from an optical color image;

conversion means for converting the primary colors into density, hue and chroma;

detecting means for determining whether or not density, hue and chroma is within predetermined density, hue and chroma ranges, respectively;

judging means for judging whether or not a color of the image data is of a predetermined color in response to determinations of said detecting means; and color changing means for changing the density, hue and chroma independently in response to the judgement result of said judging means, said color changing means selectively outputting either the density and chroma from the conversion means or a predetermined density and chroma in response to the judgement result of said judging means.

3. A color image editing apparatus comprising:

image reading means for generating image data having primary colors from an optical color image;

conversion means for converting the primary colors into density, hue and chroma;

detecting means for determining whether or not density, hue and chroma is within predetermined density, hue and chroma ranges, respectively;

judging means for judging whether or not a color of the image data is of a predetermined color in response to determinations of said detecting means; and color changing means for changing the density, hue and chroma independently in response to the judgement result of said judging means, said color changing means comprising arithmetic means for subjecting the hue from the conversion means and a predetermined hue to addition and subtraction, first selecting means for selecting an output of said arithmetic means and the predetermined hue to be outputted, and second selecting means for selecting an output from said first selecting means and the hue from the conversion means, said first selecting means carrying out the selection operation according to an output of a register where a binary coded data is stored, and said second selecting means carrying out the selection operation according to the output of said judging means.

* * * * *